US009254000B1

(12) United States Patent
Raimondi

(10) Patent No.: US 9,254,000 B1
(45) Date of Patent: Feb. 9, 2016

(54) FOOD ITEM COATER

(71) Applicant: Frank C. Raimondi, Morristown, TN (US)

(72) Inventor: Frank C. Raimondi, Morristown, TN (US)

(*) Notice: Subject to any disclaimer, the term of this patent is extended or adjusted under 35 U.S.C. 154(b) by 117 days.

(21) Appl. No.: 14/184,515

(22) Filed: Feb. 19, 2014

(51) Int. Cl.
| | |
|---|---|
| A23P 1/08 | (2006.01) |
| A23G 3/24 | (2006.01) |
| A23G 3/20 | (2006.01) |
| A23G 3/28 | (2006.01) |
| B05C 5/00 | (2006.01) |
| B05C 3/02 | (2006.01) |
| B05C 19/00 | (2006.01) |

(52) U.S. Cl.
CPC . *A23P 1/084* (2013.01); *A23G 3/20* (2013.01); *A23G 3/2076* (2013.01); *A23G 3/2092* (2013.01); *A23G 3/24* (2013.01); *A23G 3/28* (2013.01); *A23P 1/082* (2013.01); *A23P 1/085* (2013.01); *B05C 3/02* (2013.01); *B05C 5/00* (2013.01); *B05C 19/00* (2013.01)

(58) Field of Classification Search
CPC . A23G 3/0063; A23G 3/0093; A23G 3/0097; A23G 3/20; A23G 3/2076; A23G 3/2092; A23G 3/28; A23G 3/24; A23P 1/08; A23P 1/082; A23P 1/084; A23P 1/085; B05C 3/02; B05C 5/00; B05C 19/00

USPC ............... 118/13, 14, 16, 23, 24, 30, 696; 99/450.7, 494; 426/302, 306, 307, 426/289–295

See application file for complete search history.

(56) References Cited

U.S. PATENT DOCUMENTS

| | | | |
|---|---|---|---|
| 1,495,719 A * | 5/1924 | White | ............................. 118/30 |
| 2,745,374 A | 5/1956 | Pikal | |
| 3,660,118 A | 5/1972 | Raimondi | |
| 2014/0030399 A1* | 1/2014 | Farid et al. | ..................... 426/302 |

FOREIGN PATENT DOCUMENTS

GB    2161294    *   1/1986

* cited by examiner

*Primary Examiner* — Laura Edwards
(74) *Attorney, Agent, or Firm* — Luedeka Neely Group, P.C.; Rick Barnes

(57) ABSTRACT

An apparatus for coating a food item with a coating material. A food item receiving platform stages the food item for transport into the apparatus. A food item off-loading platform stages the food item for transport out of the apparatus. A coating hopper holds the coating material. A skewer supply holds food item skewers. A multi-axis robotic arm grasps one of the skewers from the skewer supply, skewers the food item on the receiving platform, transports the food item to the coating hopper, dips the food item in the coating material in the coating hopper, transports the food item to the off-loading platform, and releases the coated food item and the skewer onto the off-loading platform. A processor controls the desired operation of the multi-axis robotic arm. A user interface is used to selectively program the processor for the desired operation of the apparatus.

20 Claims, 3 Drawing Sheets

FOOD ITEM COATER

FIELD

This invention relates to the field of food processing. More particularly, this invention relates to an apparatus for coating a food item, such as making a caramel coated apple.

INTRODUCTION

Coated food items are a popular attraction at a variety of different venues. Large, high volume machines have been constructed to produce thousands of such items a day for shipment and sale. However, these machines are extremely costly, and many vendors do not require the large production that would support the up-front cost of such a machine. Typically, the only alternative is hand production of coated food items, which is not only very slow and inefficient, but also very costly on a per-item basis.

What is needed, therefore, is an apparatus that reduces issues such as those described above, at least in part.

SUMMARY

The above and other needs are met by an apparatus for coating a food item with a coating material. A food item receiving platform stages the food item for transport into the apparatus. A food item off-loading platform stages the food item for transport out of the apparatus. A coating hopper holds the coating material. A skewer supply holds food item skewers. A multi-axis robotic arm grasps one of the skewers from the skewer supply, skewers the food item on the receiving platform, transports the food item to the coating hopper, dips the food item in the coating material in the coating hopper, transports the food item to the off-loading platform, and releases the coated food item and the skewer onto the off-loading platform. A processor controls the desired operation of the multi-axis robotic arm. A user interface is used to selectively program the processor for the desired operation of the apparatus.

In various embodiments according to this aspect of the invention, the food item is an apple. In some embodiments the coating is caramel. In some embodiments the food item receiving platform is a conveyor belt. In some embodiments the food item off-loading platform is a conveyor belt. In some embodiments the coating hopper is temperature controlled for optimal application of the coating material. In some embodiments the multi-axis robotic arm spins the food item on the skewer in the coating material. In some embodiments a particle coating station holds a particulate material, and the robotic arm rolls the food item in the particle coating station, thereby covering the food item at least in part with the particulate material. In some embodiments the particulate material is nuts.

In some embodiments a dipping station holds a dipping material, and the robotic arm dips the food item in the dipping material, thereby covering the food item at least in part with the dipping material. In some embodiments the dipping material is milk chocolate. In some embodiments a drizzling station dispenses a drizzling material, and the robotic arm rotates the food item under the drizzling station, thereby covering the food item at least in part with a swirl of the drizzling material. In some embodiments the drizzling material is white chocolate.

In some embodiments the user interface is a touchscreen that presents a graphic depiction of the apparatus to the user, and the user enters a desired selection of processing and a desired order of processing for a desired number of food items. In some embodiments the graphic depiction of the apparatus displays an updated representation of the apparatus as the processing of the food item proceeds. In some embodiments a flow processing passage has a flow of air through which the robotic arm selectively passes the food item under control of the processor, and the flow of air firms at least one of the coating material, dipping material, and drizzling material on the food item.

According to another aspect of the invention there is described an apparatus for coating an apple with caramel. A receiving conveyor belt stages the apple for transport into the apparatus. A skewer hopper holds apple skewers. A temperature controlled caramel hopper holds the caramel at a desired temperature. A nut coating station holds nuts. A temperature controlled dipping station holds milk chocolate at a desired temperature. A drizzling station dispenses white chocolate in a stream. An off-loading conveyor belt stages the apple for transport out of the apparatus.

A multi-axis robotic arm grasps one of the apple skewers from the skewer hopper, skewers the apple on the receiving conveyor belt, dips the apple in the caramel in the caramel hopper, thereby covering the apple at least in part with the caramel, places the apple in the nuts in the nut coating station, thereby covering the apple at least in part with the nuts, dips the apple in the milk chocolate, thereby covering the apple at least in part with the milk chocolate, places the apple underneath the stream of white chocolate, thereby covering the apple at least in part with a swirl of the white chocolate, and releases the coated apple and the skewer onto the off-loading conveyor belt.

A processor controls the desired operation of the multi-axis robotic arm. A touchscreen presents a graphic depiction of the apparatus to the user, wherein the user enters a desired selection of processing and a desired order of processing for a desired number of apples. The graphic depiction of the apparatus displays an updated representation of the apparatus as the processing of the apple proceeds.

In various embodiments according to this aspect of the invention, the multi-axis robotic arm rotates the apple on the skewer in at least one of the caramel, the nuts, the milk chocolate, and the white chocolate stream. Some embodiments include a flow processing passage having a flow of air through which the robotic arm selectively passes the apple under control of the processor. The flow of air firms at least one of the caramel, the milk chocolate, and the white chocolate on the apple.

According to another aspect of the invention there is described an apparatus for coating an apple with a coating material. A skewer supply holds apple skewers. A temperature controlled coating hopper holds the coating material at a desired temperature. A particle coating station holds a particulate material. A temperature controlled dipping station holds a dipping material at a desired temperature. A drizzling station dispenses a drizzling material in a stream. A flow processing passage has a flow of air. A multi-axis robotic arm grasps one of the apple skewers from the skewer supply, skewers the apple, transports the apple within the apparatus, and releases the apple and the skewer when processing is complete. The multi-axis robotic arm also selectively processes the apple by at least one of (a) dipping the apple in the coating material, (b) rotating the apple in the particulate material, (c) dipping the apple in the dipping material, (d) rotating the apple under the stream of drizzling material, and € passing the apple through the flow processing passage. A processor controls the desired operation of the multi-axis robotic arm, and a user interface is used to selectively program the processor for the desired operation of the apparatus.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
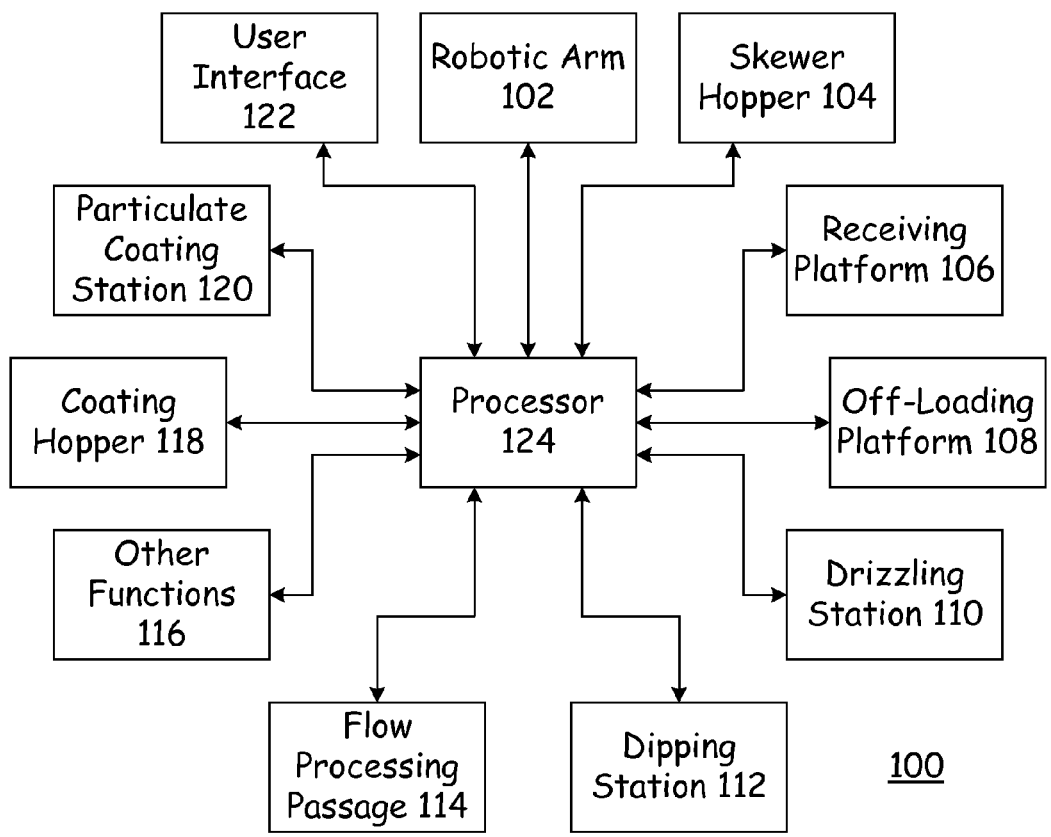
FIG. 1 is a functional block diagram of an apparatus according to an embodiment of the present invention.
Figure 3:
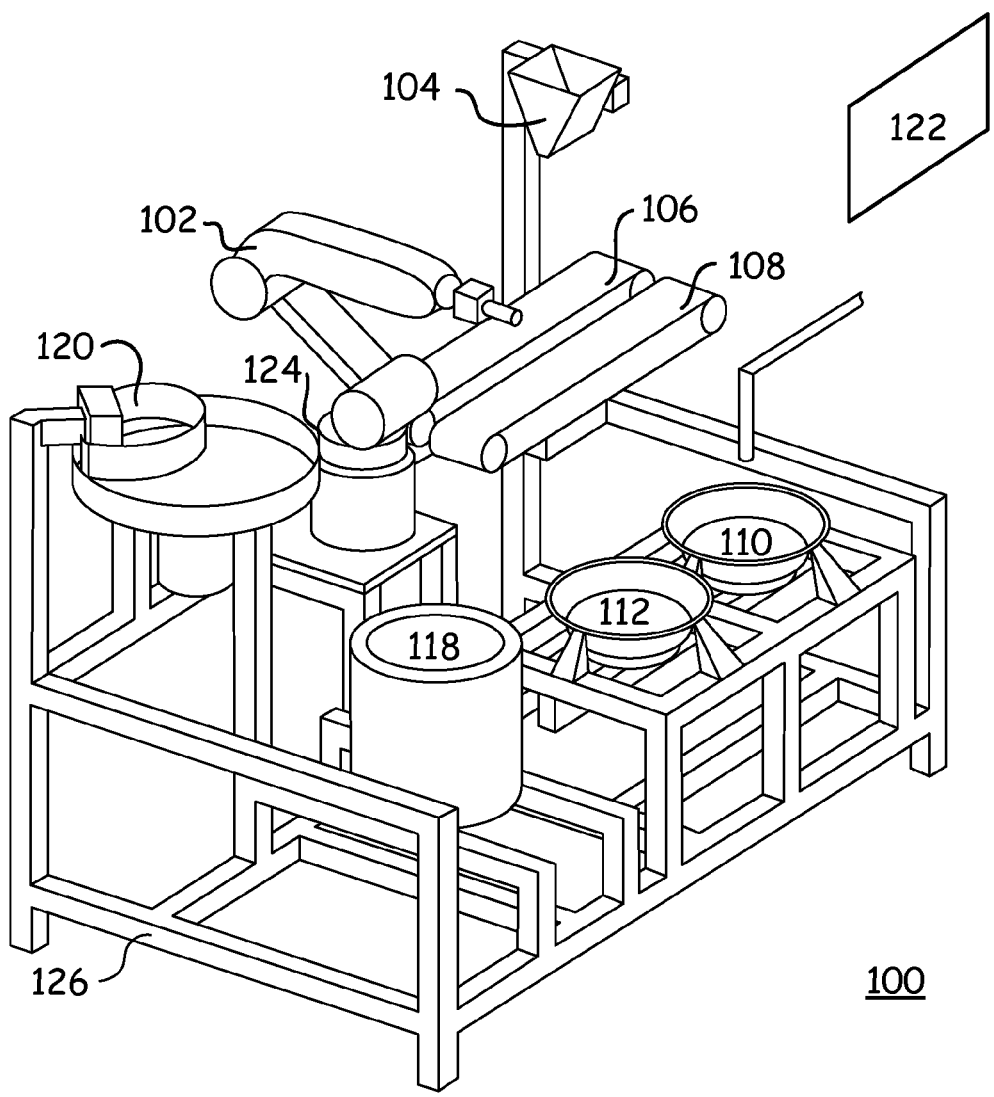
FIG. 3 is a perspective depiction of an apparatus according to an embodiment of the present invention.

With reference now to FIGS. 1 and 3, there is depicted a functional block diagram and a perspective view of an apparatus 100 according to embodiments of the present invention. The apparatus 100 is useful for coating food items, with a variety of different options. The food items can include, for example, apples, strawberries, banana pieces, popcorn balls, cookies, and candy bars. Other food items are also contemplated. The coatings can include, for example, chocolate, caramel, candy, molasses, hard tack, batter, and other items. Other coatings are also contemplated. While a variety of different combinations of these items are contemplated, the embodiment predominantly described herein is caramel coated apples.

A processor 124 controls the various aspects of the coater 100, as described below. The processor 124 can be, for example, a dedicated processor 124 such as an ASIC, or a general purpose processor 124 such as a personal computer. Options for the processing of the food item are entered such as through a user interface 122. In some embodiments the user interface 122 is a touch screen display, in which various processing options are presented as graphic representations of the physical components of the coater 100, which options are selected such as by touching the graphic representations and thereby toggling them either on or off in the processing sequence. In some embodiments the user interface 102 allows the user to select the order of the processing as well as the options to include in the processing. In some embodiments the user interface 102 allows the user to select how many of the food items will be processed according to the selected processing.

One embodiment of the coater 100 includes a receiving platform 106, on which the food items are staged for entry into the coater 100. In some embodiments the receiving platform 106 is a conveyor belt. In some embodiments the conveyor belt includes cup-like partitions that hold individual ones of the food items to be coated. When the food items are relatively precisely positioned on the receiving platform 106, the coater 100 can handle a variety of different food items in a single run, as it will be able to grasp and process them regardless of what they are.

A multi-axis machine such as a robotic arm 102 is used to transport the food item to and from the various stations as described herein. One benefit of the robotic arm 102 is that it can provide customized movement to the food item under the control of the processor 124, such as translation, rotation, and oscillation, thus enabling customized processing of the food item through the various processing stations, all without having to include customized transportation means for the food item between unique pairs of preceding and subsequent processing stations, and also providing an entertaining show for on-lookers. In some embodiments the robotic arm 102 is a multi-axis robotic arm 102, such as a model VS-6556G six axis robotic arm made by Denso Products and Services Americas, Inc. The robotic arm 102 must have sufficient reach to place the food item within the various processing stations as described herein, and have the ability to perform the mechanical operations at each station as described herein.

For example, in one embodiment the food item is acquired at the receiving platform 106 by skewering the food item with a skewer. In some embodiments the skewer is grasped by the robotic arm 102 from a hopper 104 of skewers. The robotic arm 102 then moves the skewer to the receiving platform 106, where it skewers the food item, and then uses the skewer to hold the food item as it is moved through the various processing stations as desired. In some embodiments the processor 124 communicates with the skewer hopper 104, and can receive information such as whether the hopper 104 is out of skewers. In some embodiments a mechanism in the hopper 104 stages a skewer for and releases a skewer to the arm 102 under the control of the processor 124.

Once the food item is retained by the arm 102 such as by being skewered, it can be moved to the desired processing stations in the desired order. Although one order is described herein, it is appreciated that virtually any order and combination of the processing stations is contemplated. Thus, words that indicate an order of processing as used below, such as "first," "next," "following," "after," "before," and "then" are used for convenience in describing the given embodiment, but are not meant by way of limitation.

The food item is first brought by the arm 102 to the coating hopper 118. In various embodiments the coating hopper can contain coatings such as milk chocolate, dark chocolate, white chocolate, caramel, candy coating, molasses, batter, cheese, peanut butter, butter, toffee, taffy, or other materials that can be made flowable and then can set up to a firmer consistency and substantially remain on the food item. In some embodiments the processor 124 controls the temperature of the hopper 118 so that the coating material is flowable with a viscosity such that the coating material can relatively easily coat the surface of the food item, and yet will set up with a sufficient degree of firmness within a sufficiently short period of time such that it won't all come off of the food item during subsequent processing.

In some embodiments the arm 102 dips the food item into the coating material within the coating hopper 118. In some embodiments the arm 102 provides additional movement to the food item as it is immersed, in whole or in part, in the coating material in the coating hopper 118, such as by one or more of translating the food item back and forth, oscillating the food item up and down, and rotating the food item on the skewer. These actions are selectable as desired to ensure that the food item is coated to the desired degree in the coating material.

As introduced above, the processor 124 can control the temperature of the coating material in the coating hopper 118 in some embodiments. However, there are also other functions of the coating hopper 118—and of the other processing stations—that the processor 124 can selectively control in some embodiments. For example, the processor 124 in some embodiments can control one or more of stirring the material at the processing station, filtering the material, skimming the material, circulating the material, replenishing the material, weighing the material, and covering the material when it is not in use.

Excess amounts of the coating material can be removed from the food item such as by spinning the food item within the hopper 118 above the level of the coating material, or by oscillating the food item up and down over the hopper 118 above the coating level (bouncing the food item), moving the food item back and forth over the hopper 118 above the coating level (wagging the food item), or performing a combination of these or similar motions.

Regardless of which—if any—of the methods to remove excess coating material is used, the food item can be selectively passed through a flow processing passage 114 by the robotic arm 102. The flow processing passage 114 contains within it a flow of relatively cool air that helps the coating material set up to a desired degree of firmness, such that it isn't dripping off of the food item during subsequent processing.

The food item is then transported to the particulate coating station 120 by the arm 102. The particulate coating station 120 is used in some embodiments to coat the food item with a particulate food substance, such as crushed, ground, or chopped nuts of any variety, toffee bits, chocolate flakes, candy bits, cracker crumbs, crystalized, granulated, or powdered sugar, chocolate chips, peanut butter chips, cinnamon chips, butterscotch chips, breakfast cereal, toasted oats, granola, raisins, craisins, cookie crumbs, and other such dry items. In some embodiments the particulate coating station 120 presents the particulate material in a rotating tray that is replenished from a feed hopper. In some embodiments the arm 102 rotates the food item while it is being coated with the particulate material, such as in the opposite direction of the rotation of the tray. The processor 124 can control the particulate coating station 120 in the same manner as described above in regard to the coating hopper 118. In some embodiments the coater 100 brings the food item to the particulate coating station 120 from the coating hopper 118 or one of the other processing stations in a condition of tackiness that is sufficient for the particulate material to stick to the food item.

The food item is then transported on the skewer by the robotic arm 102 to the dipping station 112. In various embodiments the dipping station 112 can contain dipping material such as milk chocolate, dark chocolate, white chocolate, caramel, candy coating, molasses, batter, cheese, peanut butter, butter, toffee, taffy, or other materials that can be made flowable and then can set up to a firmer consistency and substantially remain on the food item. In some embodiments the processor 124 controls the temperature of the dipping station 112 so that the dipping material is flowable with a viscosity such that the dipping material can relatively easily coat the surface of the food item, and whatever other material might already be covering the food item, and yet will set up with a sufficient degree of firmness within a sufficiently short period of time such that it won't all come off of the food item during subsequent processing.

In some embodiments the arm 102 dips the food item into the dipping material within the dipping station 112. In some embodiments the arm 102 provides additional movement to the food item as it is immersed, in whole or in part, in the dipping material in the dipping station 112, such as by one or more of translating the food item back and forth, oscillating the food item up and down, and rotating the food item on the skewer. These actions are selectable as desired to ensure that the food item is coated to the desired degree in the dipping material.

As introduced above, the processor 124 can control the temperature of the dipping material in the dipping station 112 in some embodiments. However, there are also other functions of the dipping station 112 that the processor 124 can selectively control in some embodiments. For example, the processor 124 in some embodiments can control one or more of stirring the dipping material, filtering the material, skimming the material, circulating the material, replenishing the material, weighing the material, and covering the material when it is not in use.

Excess amounts of the dipping material can be removed from the food item such as by spinning the food item within the dipping station 112 above the level of the dipping material, bouncing the food item, wagging the food item, or performing a combination of these or similar motions.

Regardless of which—if any—of the methods to remove excess dipping material is used, the food item can be selectively passed through the flow processing passage 114 by the robotic arm 102, which, similar to that as described above, helps the dipping material set up to a desired degree of firmness, such that it isn't dripping off of the food item during subsequent processing. The processor 124 can control the operation of the flow processing passage 114 so that parameters such as the volume, speed, and temperature of the air are at levels that enable the dipping material (or whatever other material is on the food item at the time) to set up to the desire degree. The processor can also instruct the robotic arm 102 to rotate, wag, or bounce the food item in the flow processing passage 114, as desired, or performing a combination of these or similar motions.

The food item is then brought to the drizzling station 110. The drizzling station 110 is different from the coating hopper 118 and the dipping station 112 in some embodiments. In some embodiments the food item is not immersed into a hopper of the drizzling material, but instead, the drizzling material is drizzled onto the food item by placing the food item into a stream of the drizzling material that flows onto the food item from a hopper located above the food item, and which flows such as under the influence of gravity. In some embodiments, the stream of drizzling material is applied to the food item and flows under pressure from with the hopper or other feed source that contains or provides the drizzling material.

In various embodiments the drizzling material is something such as milk chocolate, dark chocolate, white chocolate, caramel, candy coating, molasses, batter, cheese, peanut butter, butter, toffee, taffy, or other materials that can be made flowable and then can set up to a firmer consistency and substantially remain on the food item. In some embodiments the processor 124 controls the temperature of the drizzling station 110 so that the drizzling material is flowable with a viscosity such that the drizzling material can relatively easily coat the surface of the food item, and whatever other material might already be covering the food item, and yet will set up with a sufficient degree of firmness within a sufficiently short period of time such that it won't all come off of the food item during subsequent processing.

In some embodiments the robotic arm 102 is controlled by the processor 124 to both rotate and translate the food item under the drizzling material, so that the drizzling material forms decorative swirl patterns on the food item. The patterns in some embodiments are programmable, and can be selected from a store of such patterns such as through the user interface 122, and can include simple stripes or complex patterns such as names, maps, outlines, images, figures, and so forth. In some embodiments, more than one drizzling material is used to form contrasting patterns of drizzling materials, or complex images on the food item. In some embodiments a dry flowable material is used in the drizzling station, which is applied at a time when an underlying layer, such as the coating material or the dipping material, is sufficiently tacky for the drizzling material to stick to the food item. In these embodiments a material such as a powder or finely granulated particulate material can be used to form the drizzled patterns.

As introduced above, the processor 124 can control the temperature of the drizzling material in the drizzling station 110 in some embodiments. However, there are also other functions of the drizzling station 110 that the processor 124 can selectively control in some embodiments. For example, the processor 124 in some embodiments can control one or more of stifling the drizzling material, filtering the material, skimming the material, circulating the material, replenishing the material, weighing the material, pressurizing the material, and covering the material when it is not in use.

As above, the food item can be selectively passed through the flow processing passage 114 by the robotic arm 102 to help the drizzling material set up to a desired degree of firmness, such that it isn't dripping off of the food item during subsequent processing. The processor 124 can control the operation of the flow processing passage 114 so that parameters such as the volume, speed, and temperature of the air are at levels that enable the drizzling material (or whatever other material is on the food item at the time) to set up to the desire degree. The processor can also instruct the robotic arm 102 to rotate, wag, or bounce the food item in the flow processing passage 114, as desired, or performing a combination of these or similar motions.

In some embodiments the flow processing passage 114 doesn't cool the food item and coatings as described above. In some embodiments either the food item or one or more of the materials coating it is heated within the flow processing passage 114, to improve the processing of the food item, such as smoothing the coating, blending coatings, improving the adhesion of a coating, making a coating more tacky so as to better receive a dry material, and so forth.

In some embodiments the processor 124 also controls other aspects of the apparatus 124, as generally depicted as other function 116. These other functions can include, for example, playing music during processing of the food item, makes various sounds or noises during parts of the processing, illuminating various stations during processing, performing superfluous entertaining motions with the robotic arm 102 before, during, or after processing, tracking the use of the food items and the various materials so as to enable inventory control and ordering, equipment maintenance schedules, and equipment cleaning schedules.

When the apparatus 100 has completed the desired processing sequences of the food item, the robotic arm 102 delivers the food item to the off-loading platform 108, which stages the food item out of the apparatus 100. In some embodiments, the robotic arm 102 accomplishes the release of the food item by releasing the food item with the skewer onto the off-loading platform 108. In some embodiments, the off-loading platform 108 is a conveyor belt. In some embodiments, the off-loading platform is staged with packaging for the food item, such as packages for individual ones of the processed food items, in which the food item can be at least one of displayed, shipped, and sold. In such embodiments, the robotic arm 102 can release the processed food item directly into the appropriately staged package.

In some embodiments, frame 126 holds one or more of elements 102, 104, 106, 108, 110, 112, 118, 120, 122, and 124 in a spaced relationship one to another, as depicted in FIG. 3.

Figure 2:
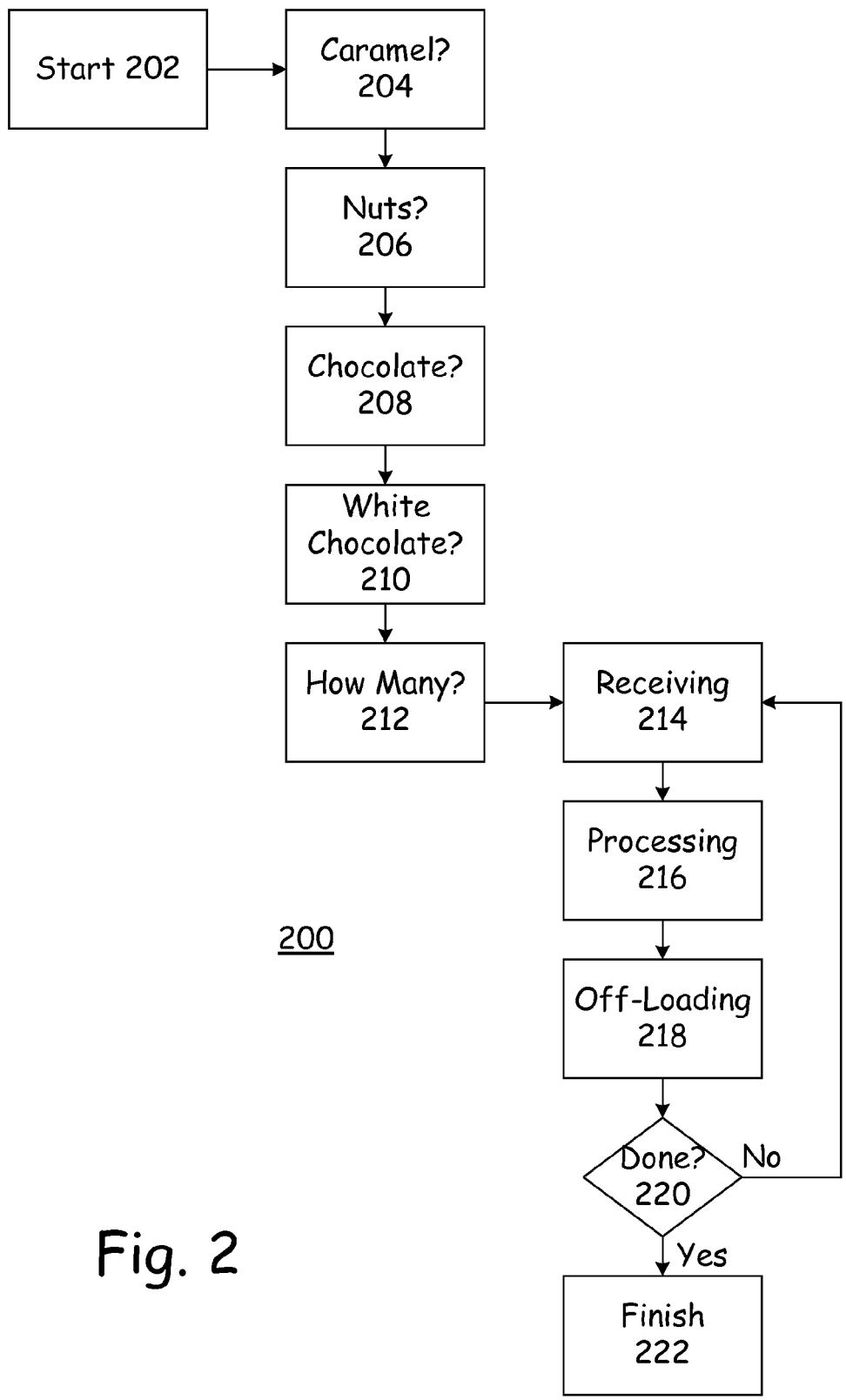
FIG. 2 is a flow chart of the operation of an apparatus according to an embodiment of the present invention.

With reference now to FIG. 2, there is depicted is a flow chart of the operation 200 of an apparatus 100 according to an embodiment of the present invention, which starts with the programming of the apparatus 100, through the user interface 122, as given at block 202. In this embodiment, the user interface 122 goes through a graphical depiction of the various options for the processing of the food item, such as an apple. Thus, choices are presented as to whether to coat the apple with caramel, as given in block 204, whether to coat the caramel apple with nuts, as given in block 206, whether to dip the apple with caramel and nuts into milk chocolate, as given in block 208, and then whether to drizzle the coated apple with white chocolate, as given in block 210. Finally, the user inputs how many apples to produce with this processing.

Once programmed, the apparatus 100, retrieves an apple from the receiving platform 106, as given in block 214, processes it according to the programming, and delivers it to the off-loading platform 108, as given in block 218. A determination is made, as given in block 220, as to whether all of the apples have been processed. If not, then another apple is picked up at the receiving platform 106, as given in block 214, and it is processed. If so, then the routine completes as given in block 222.

It is appreciated that this is just one example of processing. In some embodiments, the apparatus can be configured and programmed to use multiple coatings, dippings, drizzlings, and particulate coatings in a variety of different sequences. Also, the apparatus 100 is preferably programmed in advance (not by the user for individual runs) to monitor temperatures, levels, and flow-rates for proper processing, and appropriate use of the flow processing passage 114. Some embodiments provide for user-selectable movement embellishments, music, lighting, and so forth. In some embodiments, the apparatus 100 has functions similar to a jukebox, where the user can select the song that is played while the food item is processed. In some embodiments the music and lighting can be themed, such as for a season or an event, like Christmas, Thanksgiving, Halloween, the Fourth of July, Presidents Day, birthdays, anniversaries, various sporting events, athletic teams, high schools, colleges, universities, nationalities, genres, and so forth, all of which is selectable through the user interface 122.

In some embodiments the apparatus 100 is physically themed, such a jungle motif where the robotic arm 102 is dressed as a gorilla arm and the various stations look like hollow lots or flowing streams. In another embodiment, the apparatus 100 is themed as a moonshine still with mountain or country appointments. In another embodiment the apparatus 100 is themed with American Colonial appointments and decorations. These themes can be used as desired to configure the apparatus 100 for various locations in which it might be deployed. Other themes are also contemplated within the scope of the present invention. The themes can be useful to convert what could be an otherwise out-of-place piece of high-technology equipment into an attraction that blends in well with, plays off of, and enhances its local surroundings.

In one embodiment the food item is coated with batter, and one of the stations is a deep fat fried in which the batter-coated food item is fried. Other ingredients such as a syrup and powdered sugar can then be added to the food item, in the manner as described above.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An apparatus for coating a food item with a coating material, the apparatus comprising:
    a food item receiving platform for staging the food item for transport into the apparatus,
    a food item off-loading platform for staging the food item for transport out of the apparatus,
    a coating hopper for holding the coating material,
    a skewer supply for holding food item skewers,
    a multi-axis robotic arm for grasping one of the skewers from the skewer supply, skewering the food item on the receiving platform, transporting the food item to the coating hopper, dipping the food item in the coating material in the coating hopper, transporting the food item to the off-loading platform, and releasing the coated food item and the skewer onto the off-loading platform,
    a processor for controlling desired operation of the multi-axis robotic arm, and
    a user interface for selectively programming the processor for the desired operation of the apparatus.

2. The apparatus of claim 1, wherein the food item is an apple.

3. The apparatus of claim 1, wherein the coating is caramel.

4. The apparatus of claim 1, wherein the food item receiving platform is a conveyor belt.

5. The apparatus of claim 1, wherein the food item off-loading platform is a conveyor belt.

6. The apparatus of claim 1, wherein the coating hopper is temperature controlled for optimal application of the coating material.

7. The apparatus of claim 1, wherein the multi-axis robotic arm spins the food item on the skewer in the coating material.

8. The apparatus of claim 1, further comprising a particle coating station for holding a particulate material, the robotic arm further for rolling the food item in the particle coating station and thereby covering the food item at least in part with the particulate material.

9. The apparatus of claim 8, wherein the particulate material is nuts.

10. The apparatus of claim 1, further comprising a dipping station for holding a dipping material, the robotic arm further for dipping the food item in the dipping material and thereby covering the food item at least in part with the dipping material.

11. The apparatus of claim 10, wherein the dipping material is milk chocolate.

12. The apparatus of claim 1, further comprising a drizzling station for dispensing a drizzling material, the robotic arm further for rotating the food item under the drizzling station and thereby covering the food item at least in part with a swirl of the drizzling material.

13. The apparatus of claim 12, wherein the drizzling material is white chocolate.

14. The apparatus of claim 1, wherein the user interface is a touchscreen that presents a graphic depiction of the apparatus to the user, wherein the user enters a desired selection of processing and a desired order of processing for a desired number of food items.

15. The apparatus of claim 14, wherein the graphic depiction of the apparatus displays an updated representation of the apparatus as the processing of the food item proceeds.

16. The apparatus of claim 1, further comprising a flow processing passage having a flow of air through which the robotic arm selectively passes the food item under control of the processor, the flow of air thereby firming at least one of the coating material, dipping material, and drizzling material on the food item.

17. An apparatus for coating an apple with caramel, the apparatus comprising:
    a receiving conveyor belt for staging the apple for transport into the apparatus,
    a skewer hopper for holding apple skewers,
    a temperature controlled caramel hopper for holding the caramel at a desired temperature,
    a nut coating station for holding nuts,
    a temperature controlled dipping station for holding milk chocolate at a desired temperature,
    a drizzling station for dispensing white chocolate in a stream,
    an off-loading conveyor belt for staging the apple for transport out of the apparatus,
    a multi-axis robotic arm for,
        grasping one of the apple skewers from the skewer hopper,
        skewering the apple on the receiving conveyor belt,
        dipping the apple in the caramel in the caramel hopper and thereby covering the apple at least in part with the caramel,
        placing the apple in the nuts in the nut coating station and thereby covering the apple at least in part with the nuts,
        dipping the apple in the milk chocolate and thereby covering the apple at least in part with the milk chocolate,
        placing the apple underneath the stream of white chocolate and thereby covering the apple at least in part with a swirl of the white chocolate, and
        releasing the coated apple and the skewer onto the off-loading conveyor belt,
    a processor for controlling desired operation of the multi-axis robotic arm, and
    a touchscreen that presents a graphic depiction of the apparatus to the user, wherein the user enters a desired selection of processing and a desired order of processing for a desired number of apples, and the graphic depiction of the apparatus displays an updated representation of the apparatus as the processing of the apple proceeds.

18. The apparatus of claim 17, wherein the multi-axis robotic arm rotates the apple on the skewer in at least one of the caramel, the nuts, the milk chocolate, and the white chocolate stream.

19. The apparatus of claim 17, further comprising a flow processing passage having a flow of air through which the robotic arm selectively passes the apple under control of the processor, the flow of air thereby firming at least one of the caramel, the milk chocolate, and the white chocolate on the apple.

20. An apparatus for coating an apple with a coating material, the apparatus comprising:
    a skewer supply for holding apple skewers,
    a temperature controlled coating hopper for holding the coating material at a desired temperature,
    a particle coating station for holding a particulate material,
    a temperature controlled dipping station for holding a dipping material at a desired temperature,
    a drizzling station for dispensing a drizzling material in a stream,
    a flow processing passage having a flow of air, a multi-axis robotic arm for,
- grasping one of the apple skewers from the skewer supply,
- skewering the apple,
- transporting the apple within the apparatus,
- releasing the apple and the skewer when processing is complete, and
- selectively processing the apple by at least one of,
  - dipping the apple in the coating material,
  - rotating the apple in the particulate material,
  - dipping the apple in the dipping material,
  - rotating the apple under the stream of drizzling material, and
  - passing the apple through the flow processing passage, a processor for controlling desired operation of the multi-axis robotic arm, and a user interface for selectively programming the processor for the desired operation of the apparatus.

\* \* \* \* \*